(12) United States Patent
Ostroverkhov et al.

(10) Patent No.: US 11,161,201 B2
(45) Date of Patent: Nov. 2, 2021

(54) SYSTEM AND METHODS FOR FABRICATING A COMPONENT WITH A LASER DEVICE

(71) Applicant: General Electric Company, Schenectady, NY (US)

(72) Inventors: Victor Petrovich Ostroverkhov, Ballston Lake, NY (US); Jason Harris Karp, Niskayuna, NY (US); Mark Marshall Meyers, Halfmoon, NY (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 1099 days.

(21) Appl. No.: 15/609,121

(22) Filed: May 31, 2017

(65) Prior Publication Data

US 2018/0345405 A1    Dec. 6, 2018

(51) Int. Cl.
| | |
|---|---|
| *B23K 26/073* | (2006.01) |
| *B33Y 30/00* | (2015.01) |
| *B33Y 50/02* | (2015.01) |
| *B23K 26/342* | (2014.01) |
| *B22F 12/00* | (2021.01) |

(Continued)

(52) U.S. Cl.
CPC ............ *B23K 26/073* (2013.01); *B22F 12/00* (2021.01); *B23K 26/342* (2015.10); *B33Y 30/00* (2014.12); *B33Y 50/02* (2014.12); *B22F 10/10* (2021.01); *B22F 2203/00* (2013.01); *B33Y 10/00* (2014.12)

(58) Field of Classification Search
CPC .... B23K 26/073; B23K 26/342; B33Y 30/00; B33Y 50/02; B33Y 10/00; B22F 3/1055; B22F 2003/1056; B22F 2203/00

USPC .......................................................... 219/76.1
See application file for complete search history.

(56) References Cited

U.S. PATENT DOCUMENTS

| | | |
|---|---|---|
| 6,264,873 B1 | 7/2001 | Gigl et al. |
| 6,898,846 B2 | 5/2005 | Liu et al. |
| 7,931,851 B2 | 4/2011 | Ueno |

(Continued)

FOREIGN PATENT DOCUMENTS

| | | |
|---|---|---|
| CN | 205395459 U | 7/2016 |
| WO | 2016156824 A1 | 10/2016 |

OTHER PUBLICATIONS

NASA Langley Research Center, Hampton VA 23681 "Control methods for the electron beam free form fabrication process", Seufzer et al., Aug. 2007.

*Primary Examiner* — Dana Ross
*Assistant Examiner* — Joe E Mills, Jr.
(74) *Attorney, Agent, or Firm* — Dority & Manning, P.A.

(57) ABSTRACT

A powder melting device for an additive manufacturing system is provided. The powder melting device includes at least one laser device configured to generate at least one energy beam for forming at least one melt pool in a layer of powdered material. The powder melting device also includes at least two optical elements configured to dynamically induce beam distortion in the at least one energy beam to modify a beam spot incident on the layer of powdered material. The at least two optical elements are configured to induce at least one of an aspect ratio adjustment of the at least one energy beam, an optical powder redistribution between a periphery and a center of the at least one energy beam, and a rotation of the at least one energy beam.

16 Claims, 8 Drawing Sheets

(51) Int. Cl.
    *B33Y 10/00* (2015.01)
    *B22F 10/10* (2021.01)

(56) References Cited

U.S. PATENT DOCUMENTS

| | | |
|---|---|---|
| 8,463,116 B2 | 6/2013 | Hirahara et al. |
| 9,114,478 B2 | 8/2015 | Scott et al. |
| 9,415,443 B2 | 8/2016 | Ljungblad et al. |
| 2002/0151121 A1* | 10/2002 | Tanaka ................. B23K 26/067 438/166 |
| 2002/0158052 A1* | 10/2002 | Ehrmann ............. B23K 26/043 219/121.69 |
| 2015/0137426 A1 | 5/2015 | Van Esbroeck et al. |
| 2015/0378184 A1* | 12/2015 | Tayebati ............ G02B 27/0927 250/492.1 |
| 2018/0136458 A1* | 5/2018 | Plucinski ............... G02B 26/12 |

\* cited by examiner

SYSTEM AND METHODS FOR FABRICATING A COMPONENT WITH A LASER DEVICE

BACKGROUND

The subject matter disclosed herein relates generally to additive manufacturing systems and, more particularly, to methods and systems for fabricating a component using a laser device by inducing distortion in an energy beam generated by the laser device.

At least some additive manufacturing systems involve the buildup of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS), and LaserCusing® systems fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) The focused energy source device melts the particulate material on the build platform in and around the area where the focused energy source is incident on the particulate material, resulting in at least one melt pool. Each melt pool cools and forms at least a portion of the next layer in the build process.

In at least some DMLM systems, the laser beam or electron beam is used to scan a layer of powder to sinter and melt the desired pattern in the layers of the powder bed. The typical scanning time for such systems per layer is in the range of 70-100 seconds. For certain parts, the build time requires days of processing time. The time required to scan a component per layer prevents significant cost benefits associated with additive manufacturing from being fully realized. Additionally, at least some DMLM systems utilize a plurality of laser devices arranged as part of an array to decrease scanning times for each layer, but the energy and mechanical requirements of operating all of the laser devices decreases the cost savings and efficiency associated with the DMLM system.

BRIEF DESCRIPTION

In one aspect, a powder melting device for an additive manufacturing system is provided. The powder melting device includes at least one laser device configured to generate at least one energy beam for forming at least one melt pool in a layer of powdered material. The powder melting device also includes at least two optical elements configured to dynamically induce beam distortion in the at least one energy beam to modify a beam spot incident on the layer of powdered material. The at least two optical elements are configured to induce at least one of an aspect ratio adjustment of the at least one energy beam, an optical powder redistribution between a periphery and a center of the at least one energy beam, and a rotation of the at least one energy beam.

In another aspect, an additive manufacturing system is provided. The additive manufacturing system includes a powder bed and a powder melting device. The powder melting device includes at least one laser device configured to generate at least one energy beam for forming at least one melt pool in a layer of powdered material in the powder bed. The powder melting device also includes at least two optical elements configured to dynamically induce beam distortion in the at least one energy beam to modify a beam spot incident on the layer of powdered material. The at least two optical elements are configured to induce at least one of an aspect ratio adjustment of the at least one energy beam, an optical powder redistribution between a periphery and a center of the at least one energy beam, and a rotation of the at least one energy beam.

In yet another aspect, a method of fabricating a component in a powder bed is provided. The method includes moving at least one laser device through at least one scan path across the powder bed. The method also includes emitting at least one energy beam from the at least one laser device and dynamically inducing a beam distortion in the at least one energy beam using at least two optical elements to modify a beam spot incident on a layer of powdered material in the powder bed. The method includes using the at least two optical elements to modify the beam spot by at least one of adjusting an aspect ratio of the at least one energy beam, redistributing optical power between a periphery and a center of the at least one energy beam, and rotating an orientation of the at least one energy beam. The method further includes generating at least one melt pool in the powder bed.

DRAWINGS

These and other features, aspects, and advantages of the present disclosure will become better understood when the following detailed description is read with reference to the accompanying drawings in which like characters represent like parts throughout the drawings, wherein.

Figure 1:
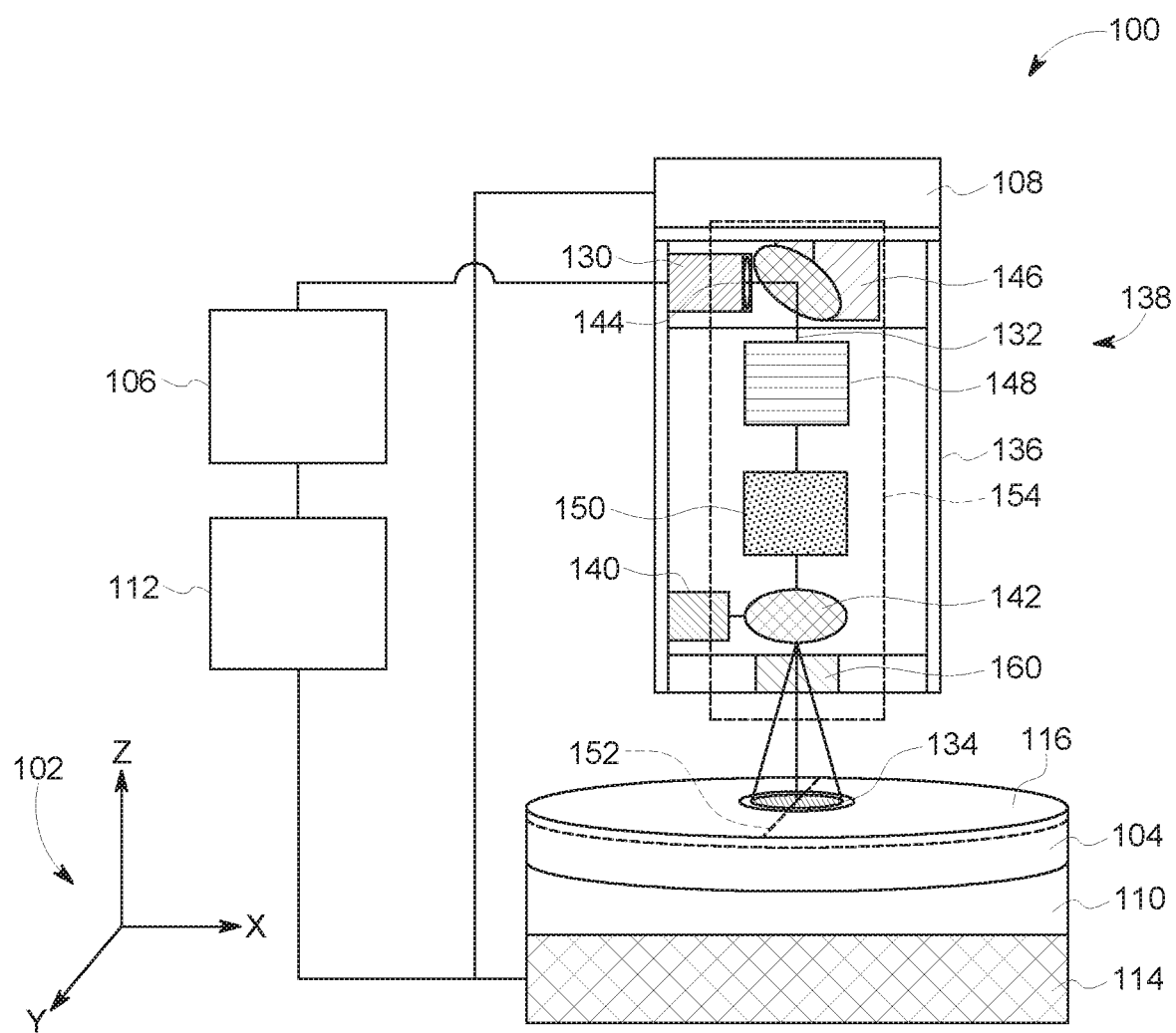
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the additive manufacturing system with a powder melting device described herein facilitate manipulation of an energy beam generated by a laser device to generate a desired beam spot shape, orientation, and power density across the beam spot. Accordingly, systems and methods described herein facilitate rapid scanning of large areas with a single laser device during additive manufacturing processes. Specifically, an additive manufacturing system includes a laser device and at least two optical elements configured to induce distortion in the energy beam generated by the laser device. The beam distortion generally results in at least one of modifying power density within the energy beam, spreading or elongation of the energy beam, and rotation of the energy beam. Such distortions to the energy beam are evidenced by the beam spot incident on the powder bed and can be used to, without limitation, increase part coverage during each scan path, reduce the number of scan paths required during the additive manufacturing process, and reduce manufacturing time FIG. 1 is a schematic view of an exemplary additive manufacturing system 100. A coordinate system 102 includes an x-axis, a y-axis, and a z-axis. In the exemplary embodiment, additive manufacturing system 100 includes a powder melting device 138 including a laser device 130, a plurality of optical elements 154, and a scanning motor 140 for fabricating a component 104 using a layer-by-layer manufacturing process. Laser device 130 provides a high-intensity heat source configured to generate a melt pool 134 (not shown to scale) in a powdered material, i.e., a powder bed 110 using an energy beam 132. Laser device 130 is contained within a housing 136 that is coupled to a mounting system 108. Additive manufacturing system 100 also includes a computer control system, or controller 106. Mounting system 108 is moved by an actuator or an actuator system 112 that is configured to move mounting system 108 in an XY plane to cooperate with at least a portion of optical elements 154 to facilitate fabricating a layer of component 104 within additive manufacturing system 100. For example, and without limitation, mounting system 108 is pivoted about a central point, moved in a linear path, a curved path, and/or rotated to cover a circular portion of the powder on powder bed 110 to facilitate directing energy beam 132 along the surface of component 104. Alternatively, housing 136 and energy beam 132 are moved in any orientation and manner that enables additive manufacturing system 100 to function as described herein.

In the exemplary embodiment, at least two optical elements 154 are disposed between laser device 130 and powder bed 110 and is configured to dynamically induce a distortion of energy beam 132 to modify a beam spot incident on build layer 116 of powder bed 110. Optical element 154 includes, without limitation, one or more of a refractive lens, such as a cylindrical lens, a prism, and a reflective mirror. In the exemplary embodiment, optical element 154 includes a collimator 144, a deformable mirror 146, a cylindrical beam expander 148, a beam rotation prism 150, a scanning mirror 142, and a scanning lens 160. In general, light exiting laser device 130 is natively divergent and some form of optics is needed to focus energy beam 132 onto powder bed 110. As such, in addition to inducing the beam distortions, i.e., aberrations (discussed further below), optical element 154 is further configured to provide energy beam focusing and shaping to add the intended energy beam 132 shape to define a beam spot shape incident on powder bed 110. While, for illustrative purpose, the figures generally show light from laser device 130 as a single pencil line or diverging lines after exiting optical element 154, as is known in optic physics, energy beam 132 will tend to actually spread out upon transmission from laser device 130 and optical element 154 is used to refocus energy beam 132 onto powder bed 110. Therefore, the role of optical element 154 is to provide different degrees of focus in the X-Y plane to facilitate forming non-circular spots and hence facilitating beam spots of significant length, relative to a width dimension. Therefore, in addition to energy beam 132 focusing, optical element 154 is generally configured to induce a distortion in energy beam 132 to cause at least one of a beam spot size modification and a power diffusion.

For the purposes of this disclosure, the term "distortion" generally refers to a modification to the shape, orientation, and/or power density of a beam spot produced by energy beam 132 on the surface of powder bed 110. The modification to the shape of the energy beam 132 is achieved by spreading or smearing which results in, without limitation, one or more of an elongation of the beam spot and an increase in the area of the beam spot. Energy beam 132 is further modified to redistribute optical power to maintain power density levels in the distorted beam spot and to rotate the orientation of energy beam 132. In the exemplary embodiment, optical element 154 has multiple optical elements operating in aggregate. The curvatures, refractive indexes (if it is not a mirrored surface), and distances between each respective element of optical element 154 all contribute to the effective focal length of the complete system in the X-Y plane. As such, regardless of the specific configuration, optical element 154 induces engineered optical aberrations that include, e.g., and without limitation, elongated beam spot shapes, power diffusion, and beam spot rotation.

Scanning motor 140 is controlled by controller 106 and is configured to move mirror 142 such that energy beam 132 is reflected to be incident along a predetermined path along powder bed 110, such as, for example, and without limitation, a linear and/or rotational scan path 152. In the exemplary embodiment, the combination of scanning motor 140 and scanning mirror 142 is a two-dimension scan galvanometer. Alternatively, scanning motor 140 and scanning mirror 142 may include a three-dimension (3D) scan galvanometer, dynamic focusing galvanometer, and/or any other scanning method that may be used to deflect energy beam 132 of laser device 130.

In the exemplary embodiment, powder bed 110 is mounted to a support structure 114, which is moved by actuator system 112. As described above with respect to mounting system 108, actuator system 112 is also configured to move support structure 114 in a Z direction (i.e., normal to a top surface of powder bed 110). In some embodiments, actuator system 112 is also configured to move support structure 114 in the XY plane. For example, and without limitation, in an alternative embodiment where housing 136 is stationary, actuator system 112 moves support structure 114 in the XY plane to cooperate with scanning motor 140 and scanning mirror 142 to direct energy beam 132 of laser device 130 along scan path 152 about powder bed 110. In the exemplary embodiment, actuator system 112 includes, for example, and without limitation, a linear motor(s), a hydraulic and/or pneumatic piston(s), a screw drive mechanism(s), and/or a conveyor system.

In the exemplary embodiment, additive manufacturing system 100 is operated to fabricate component 104 from a computer modeled representation of the 3D geometry of component 104. The computer modeled representation may be produced in a computer aided design (CAD) or similar file. The CAD file of component 104 is converted into a layer-by-layer format that includes a plurality of build parameters for each layer of component 104, for example, build layer 116 of component 104. In the exemplary embodiment, component 104 is modeled in a desired orientation relative to the origin of the coordinate system used in additive manufacturing system 100. The geometry of component 104 is sliced into a stack of layers of a desired thickness, such that the geometry of each layer is an outline of the cross-section through component 104 at that particular layer location. Scan paths 152 are generated across the geometry of a respective layer. The build parameters are applied along scan path 152 to fabricate that layer of component 104 from the material used to construct component 104. The steps are repeated for each respective layer of component 104 geometry. Once the process is completed, an electronic computer build file (or files) is generated, including all of the layers. The build file is loaded into controller 106 of additive manufacturing system 100 to control the system during fabrication of each layer.

After the build file is loaded into controller 106, additive manufacturing system 100 is operated to generate component 104 by implementing the layer-by-layer manufacturing process, such as a direct metal laser melting method. The exemplary layer-by-layer additive manufacturing process does not use a pre-existing article as the precursor to the final component, rather the process produces component 104 from a raw material in a configurable form, such as a powder. For example, and without limitation, a steel component can be additively manufactured using a steel powder. Additive manufacturing system 100 enables fabrication of components, such as component 104, using a broad range of materials, for example, and without limitation, metals, ceramics, glass, and polymers.

Figure 2:
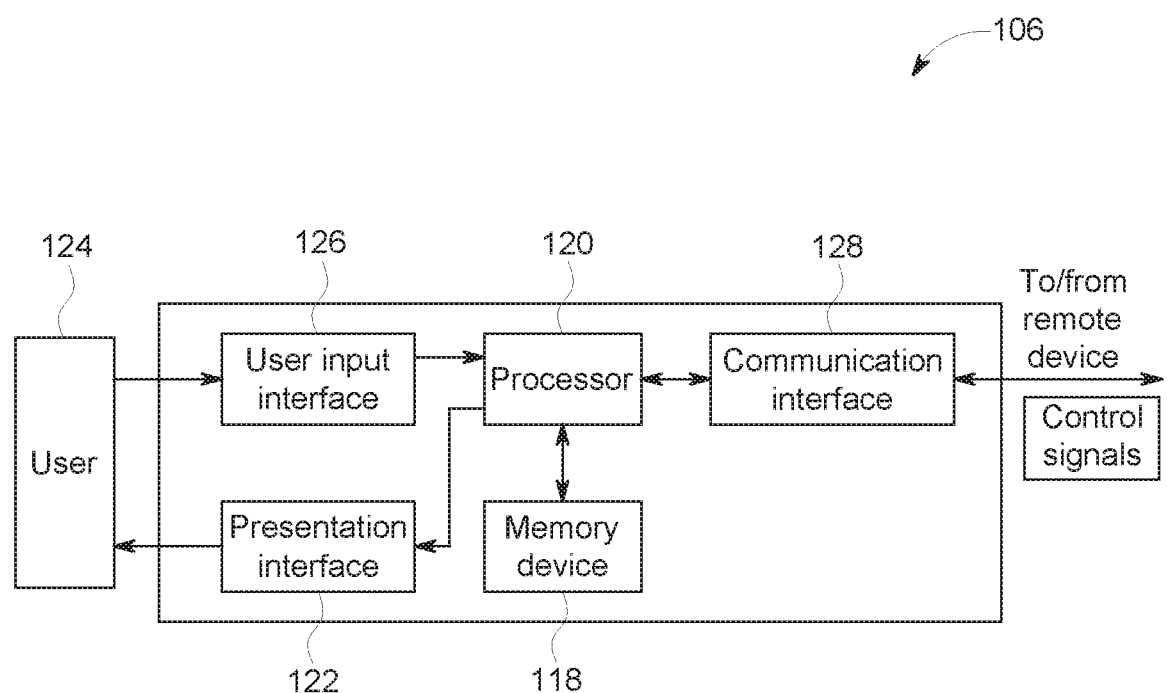
FIG. 2 is a block diagram of a controller that is used to operate the additive manufacturing system shown in FIG. 1.

FIG. 2 is a block diagram of controller 106 that is used to operate additive manufacturing system 100 (shown in FIG. 1). In the exemplary embodiment, controller 106 is one of any type of controller typically provided by a manufacturer of additive manufacturing system 100 to control operation of additive manufacturing system 100. Controller 106 executes operations to control the operation of additive manufacturing system 100 based at least partially on instructions from human operators. Controller 106 includes, for example, a 3D model of component 104 to be fabricated by additive manufacturing system 100. Operations executed by controller 106 include controlling power output of laser device 130 (shown in FIG. 1) and adjusting mounting system 108 and/or support structure 114, via actuator system 112 (all shown in FIG. 1) to control the scanning velocity of energy beam 132. Controller 106 is further configured to control deformable mirror 146, cylindrical beam expander 148, and beam rotation prism 150 to induce distortion in energy beam 132. Controller 106 is also configured to control scanning motor 140 to direct scanning mirror 142 to further control the scanning velocity of energy beam 132 within additive manufacturing system 100.

In the exemplary embodiment, controller 106 includes a memory device 118 and a processor 120 coupled to memory device 118. Processor 120 may include one or more processing units, such as, without limitation, a multi-core configuration. Processor 120 is any type of processor that permits controller 106 to operate as described herein. In some embodiments, executable instructions are stored in memory device 118. Controller 106 is configurable to perform one or more operations described herein by programming processor 120. For example, processor 120 may be programmed by encoding an operation as one or more executable instructions and providing the executable instructions in memory device 118. In the exemplary embodiment, memory device 118 is one or more devices that enable storage and retrieval of information such as executable instructions or other data. Memory device 118 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 118 may be configured to store any type of data, including, without limitation, build parameters associated with component 104. In some embodiments, processor 120 removes or "purges" data from memory device 118 based on the age of the data. For example, processor 120 may overwrite previously recorded and stored data associated with a subsequent time or event. In addition, or alternatively, processor 120 may remove data that exceeds a predetermined time interval. In addition, memory device 118 includes, without limitation, sufficient data, algorithms, and commands to facilitate monitoring of build parameters and the geometric conditions of component 104 being fabricated by additive manufacturing system 100.

In some embodiments, controller 106 includes a presentation interface 122 coupled to processor 120. Presentation interface 122 presents information, such as the operating conditions of additive manufacturing system 100, to a user 124. In one embodiment, presentation interface 122 includes a display adapter (not shown) coupled to a display device (not shown), such as a cathode ray tube (CRT), a liquid crystal display (LCD), an organic LED (OLED) display, or an "electronic ink" display. In some embodiments, presentation interface 122 includes one or more display devices. In addition, or alternatively, presentation interface 122 includes an audio output device (not shown), for example, without limitation, an audio adapter or a speaker (not shown).

In some embodiments, controller 106 includes a user input interface 126. In the exemplary embodiment, user input interface 126 is coupled to processor 120 and receives input from user 124. User input interface 126 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 122 and user input interface 126.

In the exemplary embodiment, a communication interface 128 is coupled to processor 120 and is configured to be coupled in communication with one or more other devices, such as laser device 130, and to perform input and output operations with respect to such devices while performing as an input channel. For example, communication interface 128 may include, without limitation, a wired network adapter, a wireless network adapter, a mobile telecommunications adapter, a serial communication adapter, or a parallel communication adapter. Communication interface 128 may receive a data signal from or transmit a data signal to one or more remote devices. For example, in some embodiments, communication interface 128 of controller 106 may transmit/receive a data signal to/from actuator system 112.

Presentation interface 122 and communication interface 128 are both capable of providing information suitable for use with the methods described herein, such as, providing information to user 124 or processor 120. Accordingly, presentation interface 122 and communication interface 128 may be referred to as output devices. Similarly, user input interface 126 and communication interface 128 are capable of receiving information suitable for use with the methods described herein and may be referred to as input devices.

Figure 3:
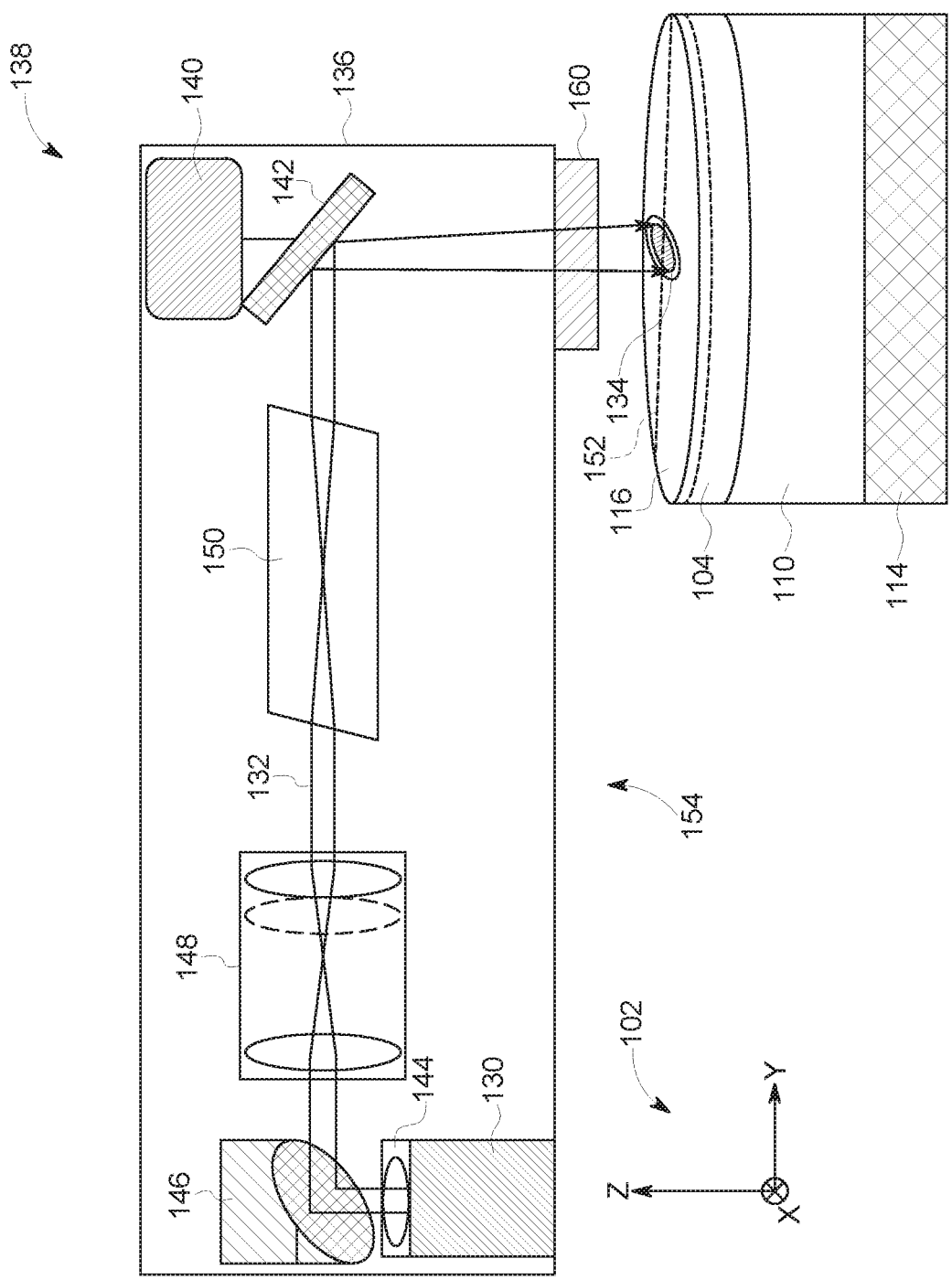
FIG. 3 is a schematic view of an exemplary powder melting device for use with the additive manufacturing system shown in FIG. 1.

FIG. 3 is a schematic view of powder melting device 138 of additive manufacturing system 100 (shown in FIG. 1). In the exemplary embodiment, powder melting device includes laser device 130 which provides a high-intensity heat source configured to generate melt pool 134 in a powdered material, i.e., powder bed 110. Powder melting device 138 also includes a plurality of optical elements 154. Laser device 130 is configured to emit an energy beam 132. In the exemplary embodiment, beam collimator 144 is disposed at the end of laser device 130 and is configured to receive and collimate energy beam 132. Energy beam 132 travels from laser device 130, through beam collimator 144, and is received by deformable mirror 146 before passing through cylindrical beam rotation prism 150. Energy beam is then reflected by scanning mirror 142 and passes through scanning lens 160 before being incident on powder bed 110.

In the exemplary embodiment, deformable mirror 146 is disposed between collimator 144 and cylindrical beam expander 148. Deformable mirror 146 is generally configured to receive energy beam 132 and to induce distortion of energy beam 132 in response to a signal from controller 106 to dynamically redistribute optical power between the periphery and the center of energy beam 132 to facilitate generating uniform power density in energy beam 132 incident on powder bed 110. In the exemplary embodiment, deformable mirror 146 is a piezoelectric-driven deformable mirror. Alternatively, deformable mirror 146 is a membrane-type deformable mirror. In other alternative embodiments, deformable mirror 146 may be configured in any manner that facilitates operation of additive manufacturing system 100 as described herein.

In the exemplary embodiment, cylindrical beam expander 148 is disposed between deformable mirror 146 and beam rotation prism 150. Cylindrical beam expander 148 is adjustable and is generally configured to receive energy beam 132 to induce further distortion of energy beam 132. The distortion of energy beam 132 is in the form of astigmatism in response to a signal from controller 106 to dynamically perform an adjustment of the aspect ratio of energy beam 132. Energy beam 132 is dynamically distorted to facilitate fitting the beam spot of energy beam 132 on powder bed 110 to the contours of component 104 during operation of additive manufacturing system 100. Astigmatism generally refers to a condition in which each of two orthogonal axial cross-sections of energy beam 132 have a different focal length in which one of the two principal cross-sections is in focus while the other of the cross-sections is not in focus. The resulting effect is the production of an elongated beam spot at each of the focal lengths. For example, without limitation, energy beam 132 has an aspect ratio of 10:1 (e.g., a line 100 μm long in the X-dimension and 1000 μm long in the Y-dimension), facilitating rapid scanning time of component 104. In other alternative embodiments, cylindrical beam expander 148 may be configured in any manner that facilitates operation of additive manufacturing system 100 as described herein.

Also in the exemplary embodiment, beam rotation prism 150 is disposed between cylindrical beam expander 148 and scanning mirror 142. Beam rotation prism 150 is generally configured to receive energy beam 132 to induce additional distortion of energy beam 132 in response to a signal from controller 106 to dynamically rotate the orientation of energy beam 132 to facilitate aligning the beam spot of energy beam 132 incident on powder bed 110 with portions of component 104 during operation of additive manufacturing system 100. For example, without limitation, beam rotation prism 150 may be installed on the axis of a rotation stage and the resulting energy beam 132 orientation after exiting beam rotation prism 150 will be rotated by an angle equal to twice the angle of beam rotation prism 150. In other alternative embodiments, beam rotation prism 150 may be configured in any manner that facilitates operation of additive manufacturing system 100 as described herein.

Using the elements of optical elements 154, in the exemplary embodiment, energy beam 132 may be dynamically distorted to generate a full trajectory for scan path 152 of powder melting device 138 across component 104. With input from controller 106, the power density, aspect ratio, and orientation angle (with respect to the X-Y plane) of energy beam 132 may be adjusted substantially simultaneously to facilitate rapid scanning of component 104 during operation of additive manufacturing system 100. Alternatively, optical element 154 has any configuration that enables operation of additive manufacturing system 100 as described herein, including, without limitation, the configurations described above.

Figure 4:
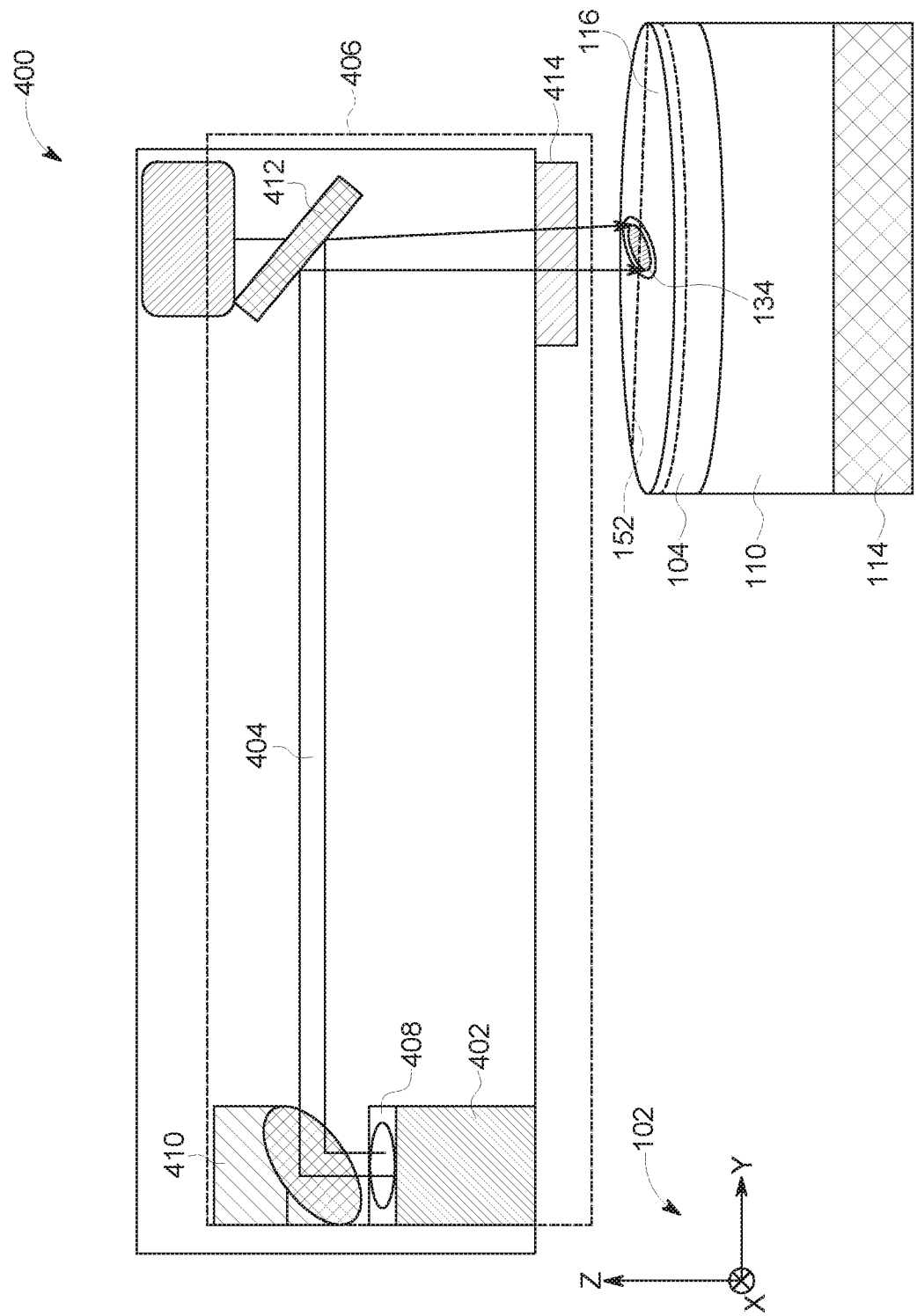
FIG. 4 is a schematic view of an alternative powder melting device for use with the additive manufacturing system shown in FIG. 1.

FIG. 4 is a schematic view of an alternative powder melting device 400 for use with additive manufacturing system 100 (shown in FIG. 1). Powder melting device 400 includes a laser device 402 configured to provide a high-intensity heat source configured to generate melt pool 134 in a powdered material, i.e., powder bed 110. Laser device 402 is configured to emit an energy beam 404 of laser energy. Powder melting device 400 also includes optical elements 406. In the exemplary embodiment, energy beam 404 is collimated by a collimator 408 and is then received by a deformable mirror 410 before being reflected by a scanning mirror 412 and passing through a scanning lens 414 before being incident on powder bed 110.

In the exemplary embodiment, deformable mirror 410 is disposed between collimator 408 and scanning mirror 412. Deformable mirror 410 is generally configured to receive energy beam 404 and to induce distortion of energy beam 404 in response to a signal from controller 106 to dynamically redistribute optical power between the periphery and the center of energy beam 404, induce astigmatism in energy beam 404 to perform an adjustment of the aspect ratio of energy beam 404, and rotate the orientation of energy beam 404. These dynamic distortions of energy beam 404 facilitate generating uniform power density in energy beam 404 incident on powder bed 110 and aligning and fitting the beam spot of energy beam 404 incident on powder bed 110 with portions of component 104. In the exemplary embodiment, deformable mirror 410 is a piezoelectric-driven deformable mirror. Alternatively, deformable mirror 410 is a membrane-type deformable mirror. In other alternative embodiments, deformable mirror 410 may be configured in any manner that facilitates operation of additive manufacturing system 100 as described herein.

Using the elements of optical element 406, in the exemplary embodiment, energy beam 404 may be dynamically distorted to generate a full trajectory for scan path 152 of powder melting device 400 across component 104. With input from controller 106, the power density, aspect ratio, and orientation angle (with respect to the X-Y plane) of energy beam 404 may be adjusted substantially simultaneously to facilitate rapid scanning of component 104 during operation of additive manufacturing system 100. Alternatively, optical element 406 has any configuration that enables operation of additive manufacturing system 100 as described herein, including, without limitation, the configurations described above.

Figure 5:
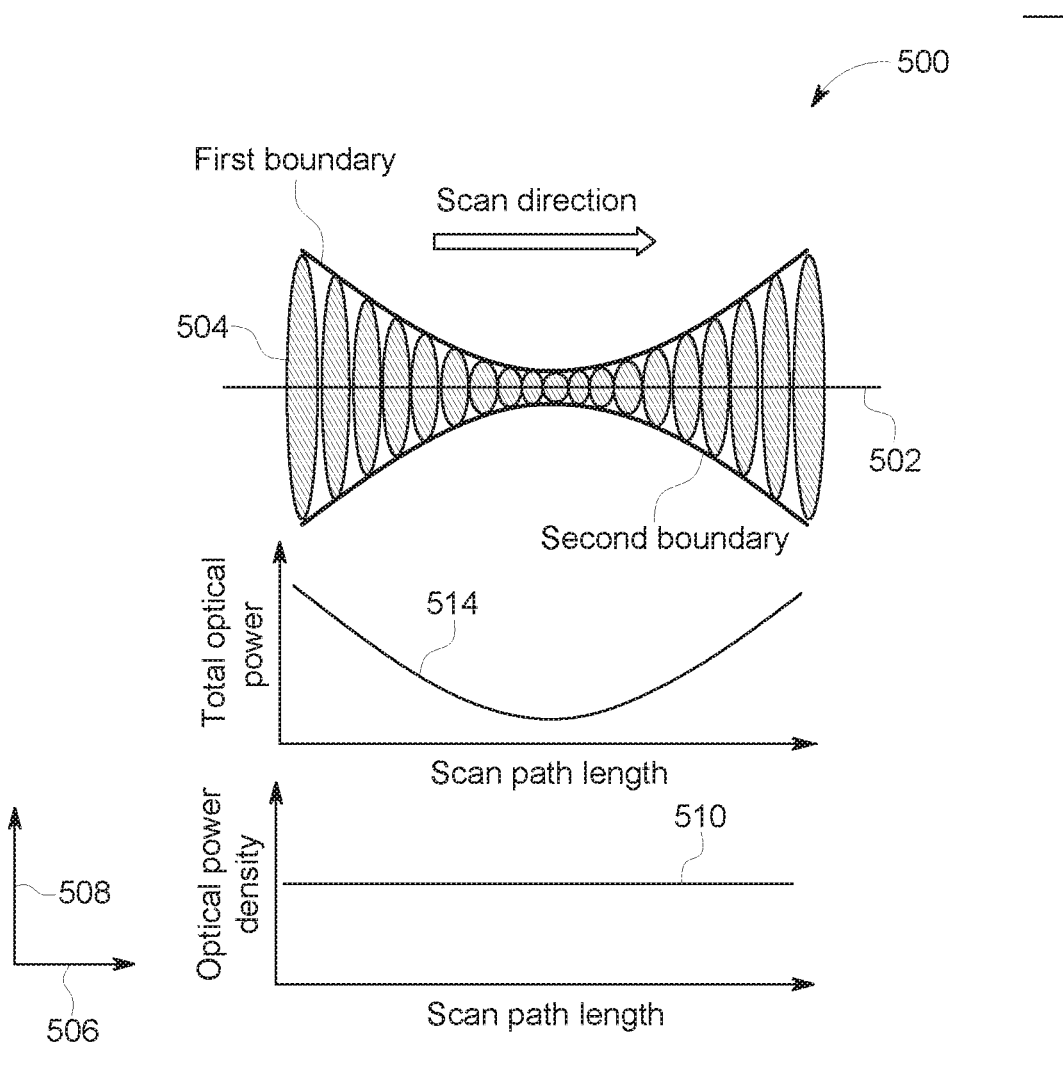
FIG. 5 is a schematic diagram of one embodiment of a uniform energy intensity profile emitted along a scan path by the powder melting device shown in FIG. 3.

FIG. 5 is a schematic diagram of one embodiment of a uniform energy intensity profile 500 emitted along a scan path 502 by powder melting device 138 (shown in FIG. 3). In the exemplary embodiment, powder melting device 138 includes laser device 130 (shown in FIG. 3) emitting energy beam 132 along scan path 502. In some embodiments, powder melting device 138 includes any number of laser devices 130, and corresponding scan paths, that enable laser powder melting device 138 to function as described herein.

In the exemplary embodiment, controller 106 (shown in FIG. 1) simultaneously generates control signals to laser device 130, deformable mirror 146, cylindrical beam expander 148, beam rotation prism 150, and scanning motor 140 to control energy beam 132 along scan path 502 to form a beam spot 504 incident on powder bed 110 (shown in FIG. 1). A power density distribution 510 is shown as incoherent irradiance (power per unit area) as a function of spatial position with respect to a first direction 506. A total optical power 514 is shown as total optical power output as a function of spatial position with respect to first direction 506. Energy beam 132 is subject to beam distortion facilitated by at least a portion of optical element 154 such that elongated beam spot 504 is produced on powder bed 110. For example, in the exemplary embodiment, optical element 154 induces beam distortion such that beam spot 504 is elongated in first direction 506, unchanged in second direction 508, and of a uniform power distribution across all of beam spot 504. As indicated in uniform energy intensity profile 500, the resulting shape of beam spot 504 as it progresses along scan path 502 changes along the dimension aligned with first direction 506 to enable beam spot 504 to fully cover the surface of component 104 defined between a first boundary and second boundary.

Figure 6:
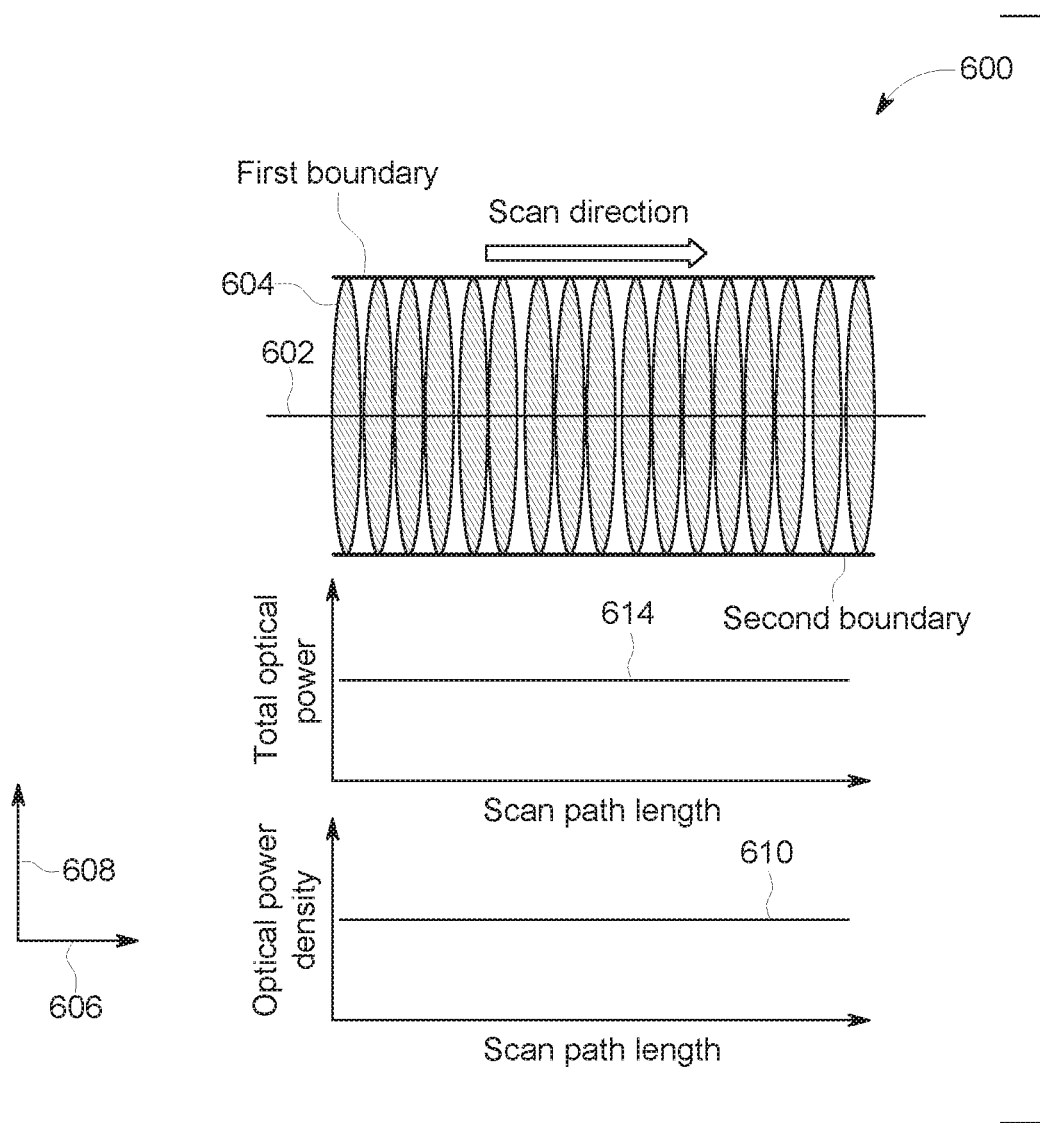
FIG. 6 is a schematic diagram of an alternative embodiment of a uniform energy intensity profile emitted along a scan path by the powder melting device shown in FIG. 3.

FIG. 6 is a schematic diagram of an alternative embodiment of a uniform energy intensity profile 600 emitted along a scan path 602 by powder melting device 138 (shown in FIG. 3). In the exemplary embodiment, powder melting device 138 includes laser device 130 (shown in FIG. 3) emitting energy beam 132 along scan path 502. In some embodiments, powder melting device 138 includes any number of laser devices 130, and corresponding scan paths, that enable laser powder melting device 138 to function as described herein.

In the exemplary embodiment, controller 106 (shown in FIG. 1) simultaneously regulates control signals to laser device 130, deformable mirror 146, cylindrical beam expander 148, beam rotation prism 150, and scanning motor 140 to control energy beam 132 along scan path 602 to form a beam spot 604 incident on powder bed 110 (shown in FIG. 1). A power density distribution 610 is shown as incoherent irradiance (power per unit area) as a function of spatial position with respect to a first direction 606. A total optical power 614 is shown as total optical power output as a function of spatial position with respect to first direction 606. Energy beam 132 is subject to beam distortion facilitated by at least a portion of optical element 154 such that elongated beam spot 604 is produced on powder bed 110. For example, in the exemplary embodiment, optical element 154 induces beam distortion such that beam spot 604 is elongated in first direction 606, unchanged in second direction 608, and of a uniform power distribution across all of beam spot 604. As indicated in uniform energy intensity profile 600, the resulting shape of beam spot 604 as it progresses along scan path 602 maintains the induced beam distortion along scan path 602 to enable beam spot 604 to fully cover the surface of component 104 defined between the first boundary and the second boundary.

Figure 7:
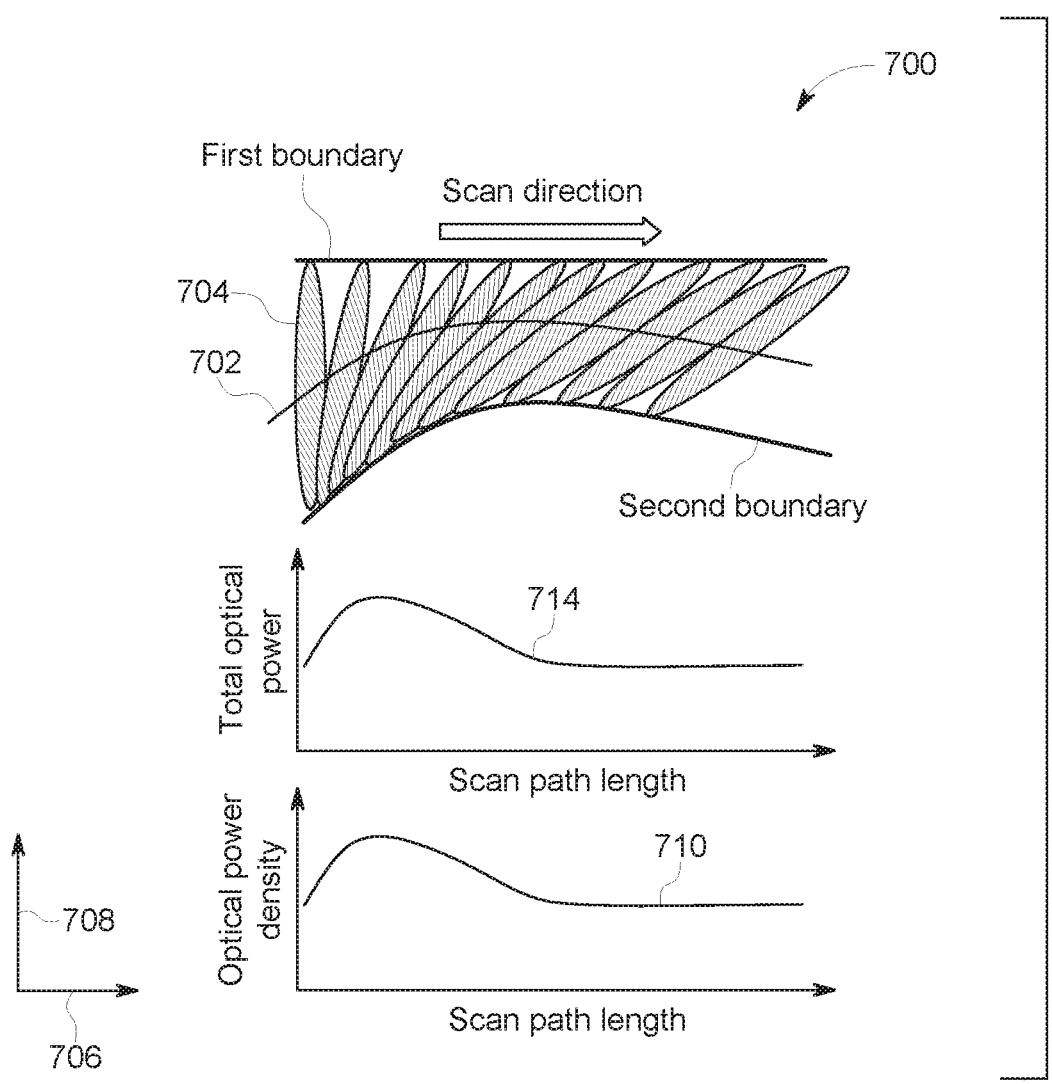
FIG. 7 is a schematic diagram of another alternative embodiment of a non-uniform energy intensity profile emitted along a scan path by the powder melting device shown in FIG. 3.

FIG. 7 is a schematic diagram of another alternative embodiment of a non-uniform energy intensity profile 700 emitted along a scan path by the powder melting device (shown in FIG. 3). In the exemplary embodiment, powder melting device 138 includes a laser device 130 (shown in FIG. 3) emitting energy beam 132 along scan path 702. In some embodiments, powder melting device 138 includes any number of laser devices 130, and corresponding scan paths, that enable laser powder melting device 138 to function as described herein.

In the exemplary embodiment, controller 106 (shown in FIG. 1) simultaneously regulates control signals to laser device 130, deformable mirror 146, cylindrical beam expander 148, beam rotation prism 150, and scanning motor 140 to control uniform output intensity profile 700 along scan path 702 to form a beam spot 704 incident on powder bed 110 (shown in FIG. 1). A power density distribution 710 is shown as incoherent irradiance (power per unit area) as a function of spatial position with respect to a first direction 706. A total optical power 714 is shown as total optical power output as a function of spatial position with respect to first direction 706. Energy beam 132 is subject to beam distortion facilitated by at least a portion of optical element 154 such that a rotated and elongated beam spot 704 is produced on powder bed 110.

For example, in the exemplary embodiment, optical element 154 induces beam distortion such that beam spot 704 is elongated in first direction 706, unchanged in second direction 708, rotated relative to scan path 702 by varying angles at a plurality of locations, and of a non-uniform power distribution across beam spot 704 for at least a portion of the illustrated scan path travel. In the exemplary embodiment, the spacing of a plurality of beam spots 704 is representative of the speed at which energy beam 132 (and therefore beam spot 704) is moving along scan path 702. The more rapid the rate of travel of energy beam 132, the higher the power output must be to maintain equal relative heating rates between all portions of beam spot 704. At least partially due to the elongated shape of beam spot 704, portions of beam spot 704 located towards the outer portion of a radius of a circle defining the rotation of beam spot 704 will be traveling more rapidly than portions of beam spot 704 located near the center of the same circle. Outer portions of beam spot 704 will have a correspondingly higher power distribution to account for the higher rate of travel. Additionally, energy beam 132 may have localized decreased or increased power outputs along scan path 702 to facilitate generating or modifying at least one physical characteristic of the underlying component, such as desired grain structure, surface finish, and hardness, among others. As indicated by non-uniform energy intensity profile 700, the resulting shape of beam spot 704 as it progresses along scan path 702 maintains the induced beam distortion along scan path 702 to enable beam spot 704 to fully cover the surface of component 104 defined between the first boundary and the second boundary.

Figure 8:
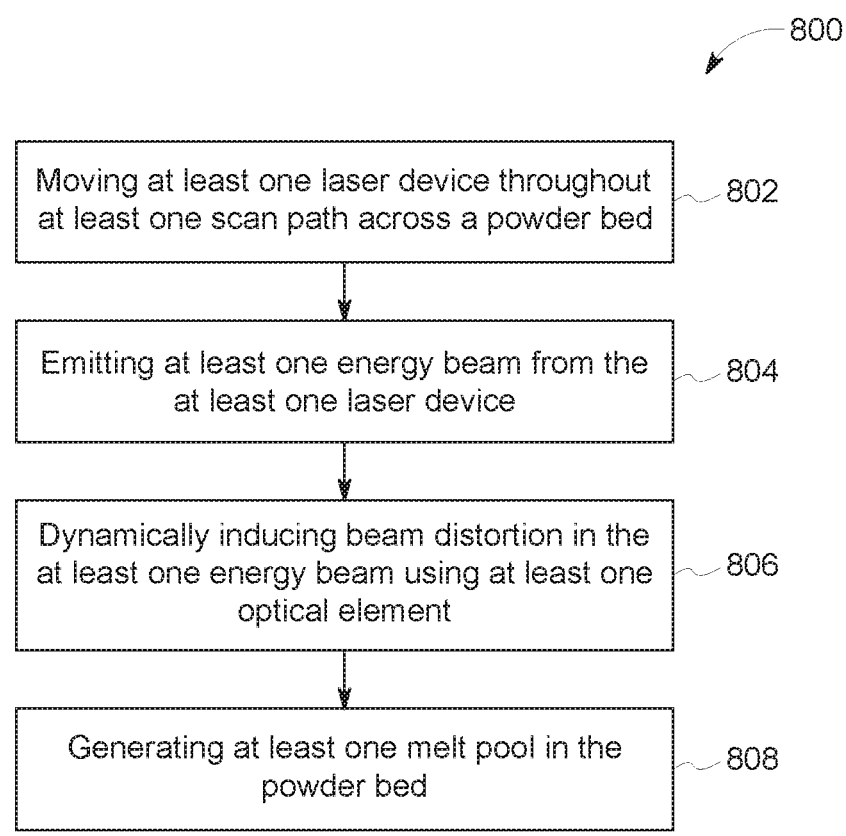
FIG. 8 is a flow chart illustrating a method for fabricating a component in a powder bed.

FIG. 8 is a flow chart illustrating a method 800 for fabricating component 104 in a powder bed. Referring to FIGS. 1 and 8, method 800 includes moving 802 at least one laser device 130 through at least one scan path 152 across powder bed 110. Method 800 further includes emitting 804 at least one energy beam 132 from at least one laser device 130. Method 800 also includes dynamically inducing 806 beam distortion in at least one energy beam 132 using at least two optical elements 154. Finally, method 800 includes generating 808 at least one melt pool 134 in powder bed 110.

Embodiments of an additive manufacturing system with a powder melting device described herein facilitate manipulation of an energy beam generated by a laser device to generate a desired beam spot shape, orientation, and power density across the beam spot. Accordingly, the systems and methods described herein facilitate rapid scanning of large areas with a single laser device during additive manufacturing processes. Specifically, an additive manufacturing system includes a laser device and at least two optical elements configured to induce distortion in the energy beam generated by the laser device. The beam distortion generally results in at least one of modifying power density within the energy beam, spreading or elongation of the energy beam, and rotation of the energy beam. Such distortions to the energy beam are evidenced by the beam spot incident on the powder bed and can be used to, without limitation, increase part coverage during each scan path, reduce number of scan paths required during the additive manufacturing process, and reduce manufacturing time.

An exemplary technical effect of the methods and systems described herein includes: (a) inducing a powder diffusion in an energy beam; (b) modifying the aspect ratio of an energy beam; (c) rotating an energy beam; (d) reducing manufacturing time by increasing coverage area of a single laser device; and (e) reducing operating costs by requiring less manufacturing time and scanning hardware (including laser devices).

Exemplary embodiments of an additive manufacturing system including a powder melting device configured to induce distortion in an energy beam are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A powder melting device for an additive manufacturing system, said powder melting device comprising:

at least one laser device configured to generate at least one energy beam for forming at least one melt pool in a melt plane defined by a layer of powdered material;

at least three optical elements configured to dynamically induce beam distortion in the at least one energy beam to modify a beam spot incident on the layer of powdered material, said at least three optical elements comprising an adjustable cylindrical beam expander disposed between a deformable mirror and a beam rotation prism configured to collectively induce:

an adjustment of an aspect ratio of the at least one energy beam in the melt plane; and an optical power redistribution between a periphery and a center of the at least one energy beam.

2. The powder melting device in accordance with claim 1, wherein said at least three optical elements are further configured to rotate an orientation of the at least one energy beam.

3. The powder melting device in accordance with claim 1, wherein said adjustable cylindrical beam expander is configured to:

perform the adjustment of the aspect ratio of the at least one energy beam; and rotate an orientation of the at least one energy beam.

4. The powder melting device in accordance with claim 1, wherein said beam rotation prism is configured to rotate an orientation of the at least one energy beam.

5. The powder melting device in accordance with claim 1, wherein said powder melting device is configured to generate a non-uniform energy intensity profile for at least one scan path of said at least one energy beam.

6. An additive manufacturing system comprising:

a powder bed; and a powder melting device comprising:

at least one laser device configured to generate at least one energy beam for forming at least one melt pool in a melt plane defined by a layer of powdered material in said powder bed; and at least three optical elements configured to dynamically induce beam distortion in the at least one energy beam to modify a beam spot incident on the layer of powdered material, said at least three optical elements comprising an adjustable cylindrical beam expander disposed between a deformable mirror and a beam rotation prism configured to collectively induce:

an adjustment of an aspect ratio of the at least one energy beam in the melt plane; and an optical power redistribution between a periphery and a center of the at least one energy beam.

7. The additive manufacturing system of claim 6, wherein said at least three optical elements are further configured to rotate an orientation of the at least one energy beam.

8. The additive manufacturing system of claim 6, wherein said adjustable cylindrical beam expander is configured to:

perform the adjustment of the aspect ratio of the at least one energy beam in the melt plane; and rotate an orientation of the at least one energy beam.

9. The additive manufacturing system of claim 6, wherein said beam rotation prism is configured to rotate an orientation of the at least one energy beam.

10. The additive manufacturing system of claim 6, wherein said powder melting device is configured to generate a non-uniform energy intensity profile for at least one scan path of said at least one energy beam.

11. A method of fabricating a component in a powder bed, said method comprising:

moving at least one laser device through at least one scan path across the powder bed;

emitting at least one energy beam from the at least one laser device;

dynamically inducing beam distortion in the at least one energy beam using at least three optical elements to modify a beam spot incident in a melt plane on a layer of powdered material in the powder bed, the at least three optical elements comprising an adjustable cylindrical beam expander disposed between a deformable mirror and a beam rotation prism for modifying the beam spot by collectively:

performing an adjustment of an aspect ratio of the at least one energy beam in the melt plane; and redistributing optical power between a periphery and a center of the at least one energy beam; and generating at least one melt pool in the powder bed.

12. The method in accordance with claim 11, wherein dynamically inducing beam distortion comprises rotating an orientation of the at least one energy beam.

13. The powder melting device in accordance with claim 1, wherein the at least one energy beam has a first dimension and a second, perpendicular, dimension in the melt plane, and wherein the adjustment of an aspect ratio of the at least one energy beam causes the first dimension to be greater than the second dimension.

14. The powder melting device in accordance with claim 1, wherein the beam rotation prism is optically downstream the adjustable cylindrical beam expander.

15. The additive manufacturing system of claim 6, wherein the beam rotation prism is optically downstream the adjustable cylindrical beam expander.

16. The method in accordance with claim 11, wherein the beam rotation prism is optically downstream the adjustable cylindrical beam expander.

* * * * *